W. T. CAMPBELL.

TIRE LOCK.

APPLICATION FILED JUNE 4, 1921.

Reissued June 13, 1922.

2 SHEETS—SHEET 1.

15,380.

Inventor.
Walter T. Campbell,
By Rippey & Kingsland,
His Attorneys.

W. T. CAMPBELL.

TIRE LOCK.

APPLICATION FILED JUNE 4, 1921.

Reissued June 13, 1922.

2 SHEETS—SHEET 2.

15,380.

Inventor.
Walter T. Campbell,
By Rippey & Kingsland,
His Attorneys.

UNITED STATES PATENT OFFICE.

WALTER T. CAMPBELL, OF ST. LOUIS, MISSOURI.

TIRE LOCK.

15,380. Specification of Reissued Letters Patent. Reissued June 13, 1922.

Original No. 1,326,180, dated December 30, 1919, Serial No. 318,581, filed August 19, 1919. Application for reissue filed June 4, 1921. Serial No. 475,095.

*To all whom it may concern:*

Be it known that I, WALTER T. CAMPBELL, a citizen of the United States, residing in St. Louis, Missouri, have invented certain new and useful Improvements in Tire Locks, of which the following is a full, clear, and exact description, such as will enable others skilled in the art to which it appertains to make and use the same.

This invention relates to locks for locking spare tires on motor vehicles and in other places where it may be desired to lock them.

The main object of my invention is to provide a theft proof spare tire lock of simple design that is capable of use with tires of various sizes and which is so constructed that the portion of same which surrounds the tire will clamp or engage the tire tightly enough to prevent the lock from chafing or cutting the tire or from rattling against the supporting device on which the tire is mounted, the lock preferably consisting of a member that can be slipped over the tire, an adjustable device for drawing said member into snug engagement with the tire and for preventing the tire from being removed from its support, and a concealed key-controlled means for preventing an unauthorized person from manipulating said adjustable device.

Another object of the invention is to provide a lock for the purpose mentioned, comprising a lock case composed of a pair of telescoping members, an element for locking the two telescoping members together in any one of various adjustments or positions, and locking mechanism arranged to co-operate with said element to prevent manipulation thereof, in combination with a band or strap which is incapable of being cut or broken and which has its ends secured to said telescoping members, respectively, and arranged to be engaged by said element and thereby locked in position to hold the tire and positively prevent its removal.

There are various other objects of the invention, and numerous advantages resulting from the peculiar and novel construction of the device, all of which will appear from the following description in which reference is made to the accompanying drawings illustrating a preferred embodiment of the invention, and in which:—

Figure 1:
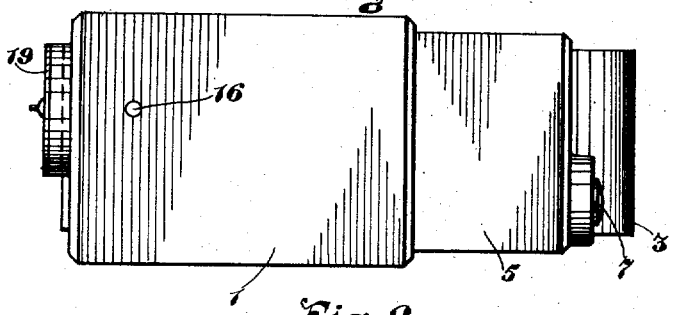
Figure 1 is a plan view of my improved lock.
Figure 2:
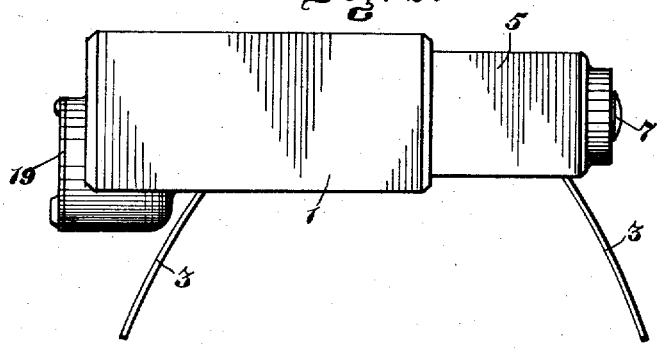
Figure 2 is a side elevation thereof.

As shown in the drawings, my invention comprises a lock case which is composed of two telescoping members. The member 1 is formed with a chamber therein which contains a locking device comprising a barrel 2 of well known construction and operation, arranged to be operated by a key in the usual manner.

The particular construction and mode of operation of a locking mechanism, co-operating with the barrel 2 is no part of the present invention which comprises any type or form of locking mechanism having or capable of the well known mode of manipulation through the medium of a key. For this reason, it is not necessary to illustrate or describe in detail the specific elements of the locking device which are controlled by the key to unlock and permit turning of the barrel 2, and which, when the key is removed, lock the barrel 2 in locking position.

A flexible and resilient strap or band 3 is employed to pass around and encircle the tire, and constitute a device to co-operate with the lock and the lock case to lock the tire to an immovable or rigid support. One end of the strap or band 3 extends through a slot or opening into the lock case member 1, and is preferably releasably secured to the lock case member by a number of screws 4 passing through holes in the strap or band 3 and into threaded recesses in the body of the lock case member 1. The opposite end of the strap or band 3 passes through a slot or opening in the co-operating lock case member 5 which is constructed for telescoping connection with the lock case member 1. The end of the strap or band 3 may be releasably attached to the lock case member 5 by screws 6.

In use, the lock is applied by separating the lock case members and placing the strap or band around the tire and around the support or object to which the tire is to be locked, then placing the lock case members in telescoping arrangement and manipulating a device that draws the band into sufficiently snug engagement with the tire to prevent the lock from cutting or chafing the tire or rattling against the support on which the tire is mounted, and finally, locking said device by means of a concealed key-controlled element.

In the form of my invention herein shown, the means for locking the telescopic parts of the lock case together, comprises an element 7 composed preferably of case-hardened metal and formed with a round head 8 on one end, seating within a similarly shaped recess in the end of the member 1 of the lock case. The opposite end of the connecting element 7 is provided with threads and is arranged to screw into a threaded hole in the end well of the lock case member 5 to draw the two members of the lock case together, and to hold them in locked connection. The ends of the band or strap 3 are formed with holes therethrough and the element 7 passes through said holes and constitutes, practically, a continuation of the strap or band since the said element 7 is composed of case-hardened metal and is therefore practically incapable of being cut or filed or broken.

Figure 5:
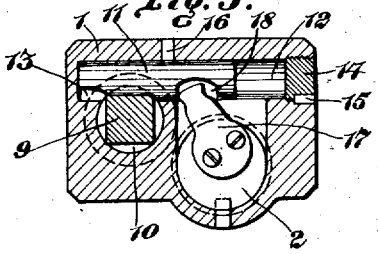
Figure 5 is a cross-sectional view on the line 5—5 of Figure 4, looking in the direction indicated by the arrows.
Figure 6:
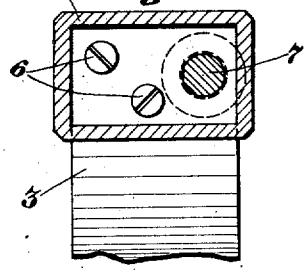
Figure 6 is a cross-sectional view near the line 6—6 of Figure 4, looking in the direction of the arrows.

Adjacent to the head thereof, the element 7 is formed with a portion 9 which is square in cross section and which is formed between a pair of circumferential flanges 10. A lock bolt 11 is supported within a chamber 12 formed in the case member 1. The lock bolt 11 is movable at right angles to the connecting element 7 and across the square portion 9 thereof. The lock bolt 11 co-operates with the square portion 9 to prevent turning or manipulation of the connecting element 7. The end of the lock bolt is preferably beveled slightly, as shown at 13 (Figure 5), so that said bolt may readily slide across the square portion 9 to locking position. The end of the chamber 12 is closed by a plug 14 which is screwed into the threaded end of the chamber and locked therein by a pin 15 driven into a recess formed in the abutting portions of the body of the lock case and the plug 14. The outer ends of the plug 14 and the pin 15 are perfectly smooth and flush with the smooth surface of the lock case member, so that said parts can not be engaged and drawn out. The lock bolt may be guided in its movements and prevented from turning by a key 16 rigid with the lock case, and extending into a groove formed longitudinally in said bolt 11.

The barrel 2 of the locking mechanism, as previously stated, is of the well known type which is manipulative by a key. As shown, the barrel 2 of the locking mechanism has an arm 17 in connection therewith, extending into an appropriate notch or recess 18 in the lock bolt 11. The function of the arm 17 is to move the lock bolt 11 to and from locking position and to lock said lock bolt in locking position and to hold the lock bolt in locking position until the proper key is applied in the lock and manipulated.

The key-hole of the lock may be protected by a guard or shield in the form of a disk 19 pivotally supported and movable to and from position to cover the key hole.

Figure 3:
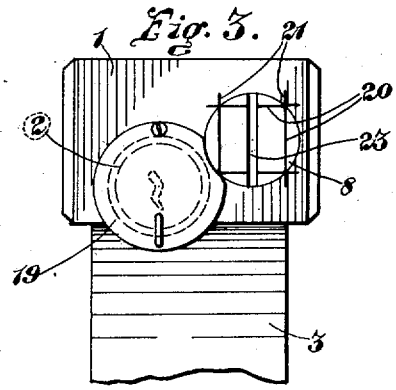
Figure 3 is an elevation viewed from another side of the device.
Figure 4:
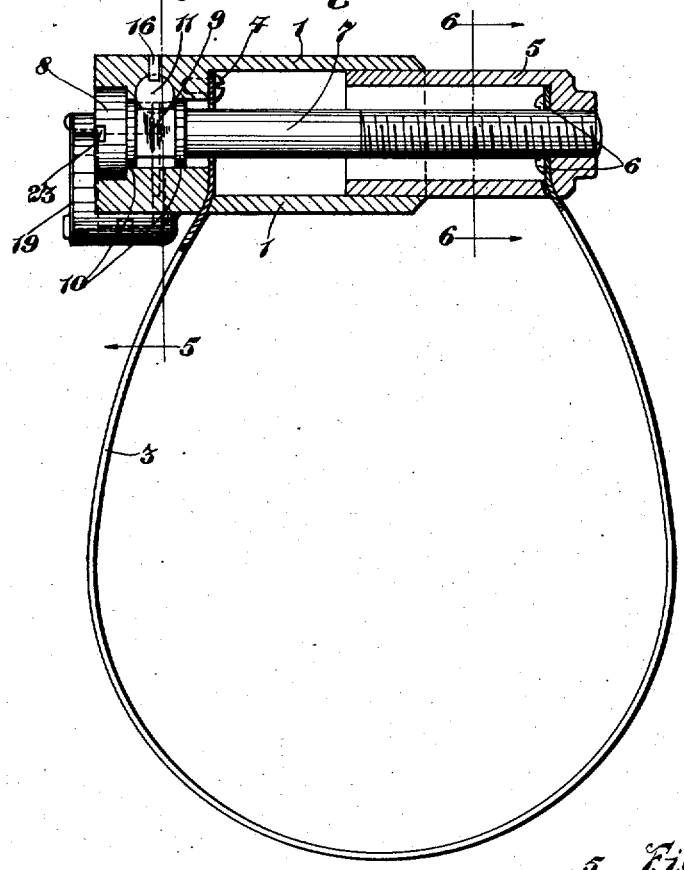
Figure 4 is a sectional view of the lock case.

It is desirable to provide the element 7 with an appropriate means or device to indicate the position of the square portion 9 thereof. For this purpose, the head 8 is provided with demarcations 20 (Figure 3) conforming to the flat sides of the square portion 9. By observing the demarcations 20, the position of the square portion 9 may be known, and by turning the element 7, the square portion 9 may be moved to proper position to permit the lock bolt 11 to engage therewith. Demarcations 21 may be formed on the adjacent portion of the lock case to serve as a guide.

In the form shown, the head 8 is provided with a groove 23 for the reception of a screw driver or other appropriate tool capable of use to turn the element 7 when the lock bolt 11 is disengaged therefrom.

The connecting bolt or element 7 functions to draw the two case members to any desired adjustment, and to permit the size or length of the lock case to be varied sufficiently to insure the band 3 clamping the tire tightly enough to prevent the lock from moving relatively to the tire, and thus chafing the tire or rattling against the support on which the tire is mounted. This enables the lock to be applied satisfactorily to tires of different sizes, since, by leaving the case members extended the lock will fit around a large tire; and, by drawing the telescoping members closer together, the size of the lock is reduced, as required to fit around a small tire. Between its maximum and minimum adjustments, the lock case may be minutely adjusted as required to fit closely around tires of various sizes. Thus, I have provided a lock which is very flexible or elastic in its adjustments.

From the foregoing, it will be comprehended that I have provided a simple and efficient spare tire lock that is practically indestructible, that is capable of use with tires of various sizes and which is so constructed that it will not rattle or chafe the tire. It will be apparent that the specific construction and arrangement may be varied without departure from the nature and principle of the invention. Therefore, I do not restrict myself to unessential features or details, but

What I claim and desire to secure by Letters Patent is:—

1. A tire lock, comprising a case composed of a pair of telescoping members, a strap or band having its ends connected to said members, respectively, a threaded bolt supported by one of said case members operable to effect threaded engagement with and hold the other case member in telescoping connection with the first one, and mechanism for locking said bolt in position to hold the case members together.

2. A tire lock, comprising a lock case composed of two telescoping members movable into and out of telescoping connection, a strap or band having its ends connected to said members, respectively, a bolt revoluble and supported by one of said members, and arranged to effect threaded connection with the other one of said members and draw said members to hold them in any desired adjustment, a lock bolt movable into and out of locking engagement with said first named bolt, and locking mechanism controlling said lock bolt.

3. A tire lock, comprising a lock case composed of two telescoping members movable into and out of telescoping connection, a bolt revoluble and supported by one of said members, and arranged to effect threaded connection with the other one of said members to draw said members to and hold them in any desired adjustment, a lock bolt movable into and out of locking engagement with said first named bolt, locking mechanism controlling said lock bolt, and a strap or band having its ends attached to said case members, respectively, and provided with holes through which said bolt extends when said case members are connected together.

4. A tire lock, comprising a lock case composed of two telescoping members, a revoluble bolt supported by one of said members and arranged to effect threaded connection with the other one of said members, and being operable to hold said members in any one of various selected adjustments, a lock bolt movable into and out of locking engagement with said first named bolt, means for guiding and preventing the lock bolt from turning, means for indicating when said first named bolt is in position to be engaged by said lock bolt, and a strap or band having its ends attached to said case members, respectively, and being provided with holes through which said bolt extends when said case members are connected by said bolt.

5. A tire lock, comprising a strap or band having holes therethrough adjacent to its ends, an element connected to one end of said strap and having a threaded hole therein, a second element, a bolt in connection with said second element passing through the holes in said strap and arranged to effect threaded connection in the threaded hole in said first named element, locking mechanism carried by one of said elements, and a lock bolt under control of said locking mechanism movable to and from position to lock said first named bolt in any one of different selected positions.

6. A tire lock, comprising a case composed of two telescoping members adapted to be moved to various selected relative adjustments, a strap or band having its ends connected to said members, respectively, one of said members having a threaded hole therein, a threaded bolt carried by the other member of the lock case, and arranged to be screwed into said threaded hole to adjust and hold said case members in any selected adjustment, a square portion on said bolt, a lock bolt movable into and out of engagement with said square portion, and arranged to prevent said first named bolt from turning when in engagement with said square portion, and locking mechanism controlling said lock bolt.

7. A tire lock, comprising a lock case composed of two telescoping members movable into and out of telescoping connection, a strap or band having its ends connected to said case members, respectively, and having holes therethrough, a bolt passing through the holes in said strap or band and being operable to adjust and hold said case members in any one of various selected adjustments, flanges on said bolt, a lock bolt movable to and from position between said flanges to lock said first named bolt from turning and to prevent movement of said case members towards each other, and means for controlling said lock bolt.

8. A tire lock, comprising a case composed of two telescoping members movable into and out of telescoping connection, one of said members having a threaded hole therein, a bolt supported by the other one of said case members and being operable to engage in said threaded hole and to move said case members to and hold them in any desired adjustment, a pair of flanges on said bolt, a square portion on said bolt between said flanges, a lock bolt movable to and from position between said flanges and into contact with said square portion, locking mechanism controlling said lock bolt, and a strap or band having its ends extending into said case members, respectively, and provided with holes through which said threaded bolt extends.

9. A spare tire lock for vehicles, comprising a structure adapted to be placed around a tire and the support which carries the tire and composed of a substantially rigid U-shaped member formed from metal that is slightly ductile or resilient, a device for drawing the ends of said member towards each other, and means for preventing an unauthorized person for manipulating said device to release or remove said member.

10. A spare tire lock for vehicles, comprising a structure adapted to be placed around a tire and the support which carries the tire and composed of a substantially U-shaped member formed from metal that is slightly ductile or resilient, a device for drawing the ends of said member towards each other, a concealed locking element for preventing said device from being manipulated to release or remove said member, and a key-controlled means for holding said locking element in its locked position.

11. A spare tire lock for vehicles, comprising an indestructible member formed from a flat band or strip of metal that is slightly ductile or resilient, a device for drawing said member into snug engagement with the tire and co-operating with said member to form a structure that surrounds the tire and the support, and a key-controlled concealed locking element for preventing said device from being manipulated to release or remove said structure from the tire and support.

12. A spare tire lock for vehicles, comprising a flexible member that is adapted to be passed around a tire mounted on a support, a screw for drawing the free ends of said member together and locking it in snug engagement with the tire, and a concealed key-controlled element for locking said screw.

13. A spare tire lock for vehicles, comprising an indestructible member of substantially U shape in general outline that is adapted to be slipped over a tire mounted on a support, an adjustable, indestructible device arranged transversely of the end portions of said member for drawing said end portions towards each other, and means for preventing an unauthorized person from manipulating said device.

14. A spare tire lock for vehicles, consisting of a device that is adapted to be passed around a tire mounted on a support, members secured to the end portions of said device, a screw rotatably mounted in one of said members and adapted to be moved into engagement with screw threads in the other member to draw said members towards each other, and a concealed key controlled means for locking said screw.

WALTER T. CAMPBELL.